(12) United States Patent
Son et al.

(10) Patent No.: US 9,904,365 B2
(45) Date of Patent: Feb. 27, 2018

(54) TOUCH PANEL

(71) Applicant: LG Display Co., Ltd., Seoul (KR)

(72) Inventors: Ji Eun Son, Paju-si (JP); Ki Duk Kim, Paju-si (JP); Jong Hee Hwang, Goyang-si (KR); Jong hyun Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 54 days.

(21) Appl. No.: 14/338,709

(22) Filed: Jul. 23, 2014

(65) Prior Publication Data
US 2015/0185928 A1    Jul. 2, 2015

(30) Foreign Application Priority Data
Dec. 31, 2013  (KR) .......................... 10-2013-0168341

(51) Int. Cl.
*G06F 3/041* (2006.01)
*G06F 3/01* (2006.01)
*G06F 3/044* (2006.01)

(52) U.S. Cl.
CPC .............. *G06F 3/016* (2013.01); *G06F 3/044* (2013.01); *G06F 3/0416* (2013.01)

(58) Field of Classification Search
CPC ........ G06F 3/016; G06F 3/041; G06F 3/0412; G06F 3/0416; G06F 3/044; G06F 3/047; G06F 2203/04104; G06F 2203/04106
USPC ......... 345/173, 174; 178/18.01, 18.03, 18.06
See application file for complete search history.

(56) References Cited

U.S. PATENT DOCUMENTS

| | | | | |
|---|---|---|---|---|
| 5,231,381 A | * | 7/1993 | Duwaer | G06F 3/016 |
| | | | | 178/18.03 |
| 5,670,755 A | * | 9/1997 | Kwon | G06F 3/045 |
| | | | | 178/18.05 |
| 6,380,930 B1 | * | 4/2002 | Van Ruymbeke | G06F 1/1616 |
| | | | | 178/18.01 |
| 7,649,524 B2 | * | 1/2010 | Haim | G06F 3/041 |
| | | | | 345/173 |
| 8,743,086 B2 | * | 6/2014 | Chen | G06F 3/044 |
| | | | | 178/18.06 |
| 9,069,384 B2 | * | 6/2015 | Koga | G06F 3/041 |

(Continued)

FOREIGN PATENT DOCUMENTS

CN   102253774 A   11/2011
CN   102609128 A   7/2012

(Continued)

OTHER PUBLICATIONS

Chinese First Office Action, Chinese Application No. 201410521187.X, dated Apr. 6, 2017, 10 pages. (with concise explanation of relevance).

(Continued)

*Primary Examiner* — Jason Mandeville
(74) *Attorney, Agent, or Firm* — Fenwick & West LLP

(57) ABSTRACT

One embodiment of a touch panel comprises a substrate; a sensing electrode formed over the substrate, the sensing electrode configured to sense finger touch input and to provide haptic feedback; and an antenna formed over the substrate, the antenna configured to sense pen touch input; wherein a first mode in which the finger touch input is sensed, a second mode in which the haptic feedback is provided, and a third mode in which pen touch input is received are time-divisionally performed.

15 Claims, 18 Drawing Sheets

(56) References Cited

U.S. PATENT DOCUMENTS

| | | | |
|---|---|---|---|
| 9,323,326 B2* | 4/2016 | Cruz-Hernandez | G06F 3/044 |
| 2009/0267905 A1* | 10/2009 | Hsu | G06F 3/044 |
| | | | 345/173 |
| 2011/0157080 A1 | 6/2011 | Ciesla et al. | |
| 2011/0216030 A1* | 9/2011 | Lee | G06F 3/041 |
| | | | 345/174 |
| 2011/0227858 A1* | 9/2011 | An | G06F 3/044 |
| | | | 345/174 |
| 2011/0298748 A1* | 12/2011 | Chen | G06F 3/044 |
| | | | 345/174 |
| 2013/0106758 A1 | 5/2013 | Radivojevic et al. | |
| 2013/0106765 A1* | 5/2013 | Beecher | G06F 3/044 |
| | | | 345/174 |
| 2013/0155006 A1* | 6/2013 | Li | G06F 3/046 |
| | | | 345/174 |
| 2014/0062898 A1* | 3/2014 | Singh | G06F 1/3262 |
| | | | 345/173 |
| 2014/0078104 A1* | 3/2014 | Lee | G06F 3/044 |
| | | | 345/174 |
| 2014/0354553 A1* | 12/2014 | Dai | G06F 3/0416 |
| | | | 345/173 |
| 2015/0022224 A1* | 1/2015 | Ruusunen | G06F 3/0416 |
| | | | 324/691 |

FOREIGN PATENT DOCUMENTS

| | | |
|---|---|---|
| CN | 102713805 A | 10/2012 |
| CN | 103164090 A | 6/2013 |
| CN | 103294225 A | 9/2013 |
| WO | WO 2013/060932 A1 | 5/2013 |

OTHER PUBLICATIONS

Chinese Second Office Action, Chinese Application No. 201410521187.X, Nov. 1, 2017, 23 pages.

* cited by examiner

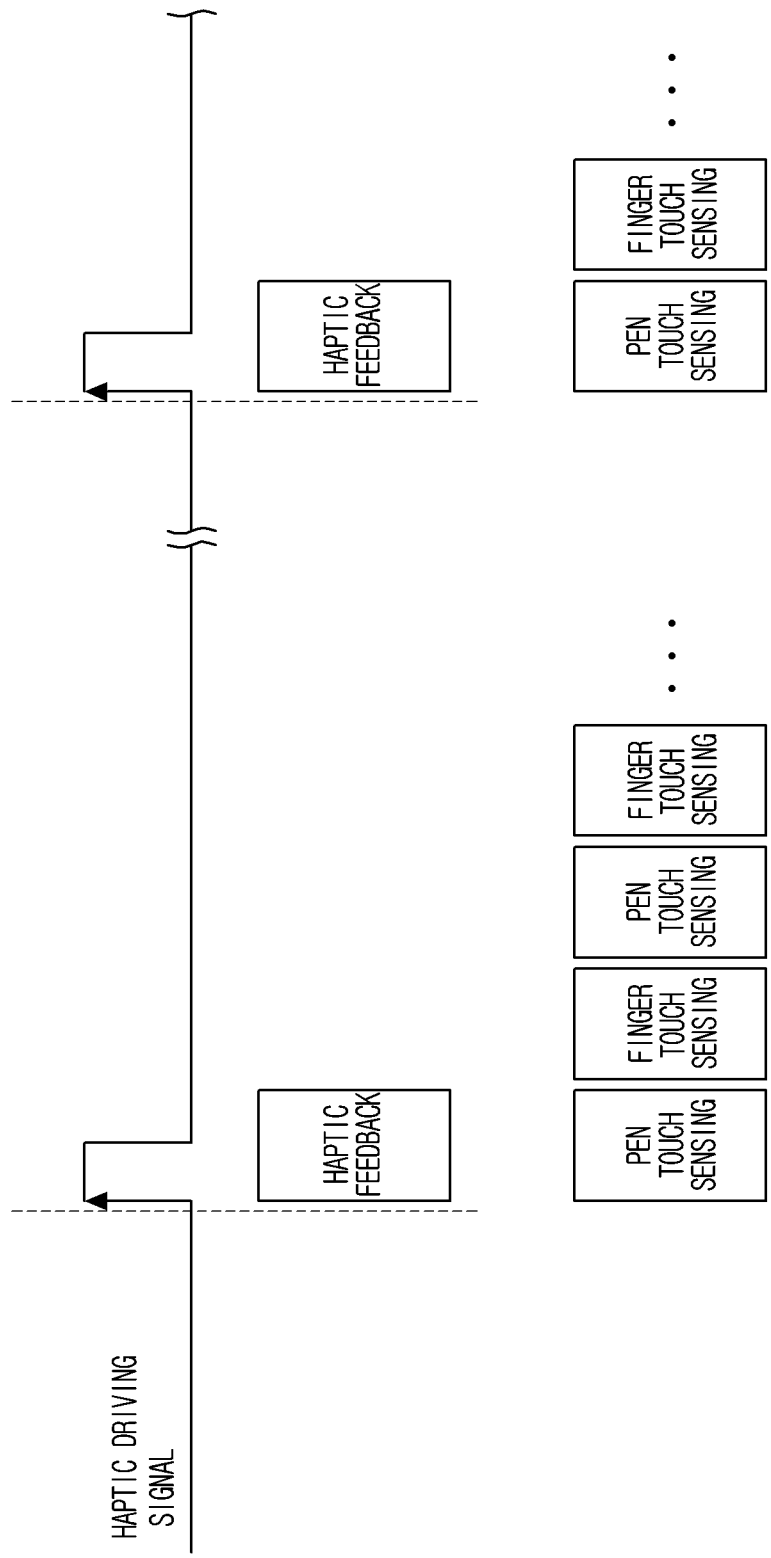

TOUCH PANEL

CROSS-REFERENCE TO RELATED APPLICATIONS

The present application claims priority under 35 U.S.C. § 119(a) of Korean Patent Application No. 10-2013-0168341 filed on Dec. 31, 2013, which is hereby incorporated by reference in its entirety.

BACKGROUND

Field of the Disclosure

The present application relates to a touch panel.

Description of the Related Art

Recently, touch panels are being applied to a variety of electrical appliances. The touch panels can receive data via an input device, such as a finger, a stylus or other input devices.

Such touch panels can be largely classified into an electrostatic capacity type and a resistant film type. The resistant film type touch panel enables a glass and an electrode to be shorted by a pressure from an input device and detects a touch position. The electrostatic capacity type touch panel senses a variation of the capacitance between electrodes and detects a touch position.

Repeated use of the resistant film type touch panel can cause deterioration of performance and scratches. Due to this, the electrostatic capacity type touch panel with superior durability and long lifespan is the center of public interest.

Recently, the touch panel is required to have multiple functions such as a finger touch sensing function, a pen touch sensing function, a haptic function and so on.

In order to further provide the pen touch sensing function and the haptic function, a pen touch sensing layer and a haptic feedback substrate must be added to the touch panel. In this case, the number of substrates must increase. Due to this, the touch panel becomes thicker and heavier.

The latest trend of slimness and lightweight requires the touch panel to reduce the number of substrates.

SUMMARY

One embodiment of a touch panel comprises a substrate; a sensing electrode formed over the substrate, the sensing electrode configured to sense finger touch input and to provide haptic feedback; and an antenna formed over the substrate, the antenna configured to sense pen touch input; wherein a first mode in which the finger touch input is sensed, a second mode in which the haptic feedback is provided, and a third mode in which pen touch input is received are time-divisionally performed.

In one embodiment, a touch panel comprises a substrate; a sensing electrode formed over the substrate, the sensing electrode configured to sense finger touch input and to provide haptic feedback; and an antenna formed over the substrate; wherein the sensing electrode and a portion of the antenna are formed with a substantially same vertical distance from the substrate.

In one embodiment, a method of a touch driver unit for driving a touch panel including a substrate, a sensing electrode formed over the substrate and configured to sense finger touch input and to provide haptic feedback, and an antenna formed over the substrate and configured to sense pen touch input, the method comprises alternatively driving a touch driver of the touch driver unit that is configured to sense touch input on the touch panel via the sensing electrode and an antenna driver of the touch driver unit that is configured to sense pen touch input via the antenna; and responsive to either the touch input or pen touch input, driving a haptic driver of the touch driver unit that is configured to generate a signal to the sensing electrode to provide the haptic feedback.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings:

FIGS. 11A and 11B are diagrams illustrating a method of driving a touch panel according to a second embodiment of the present disclosure;

DETAILED DESCRIPTION

Figure 1:
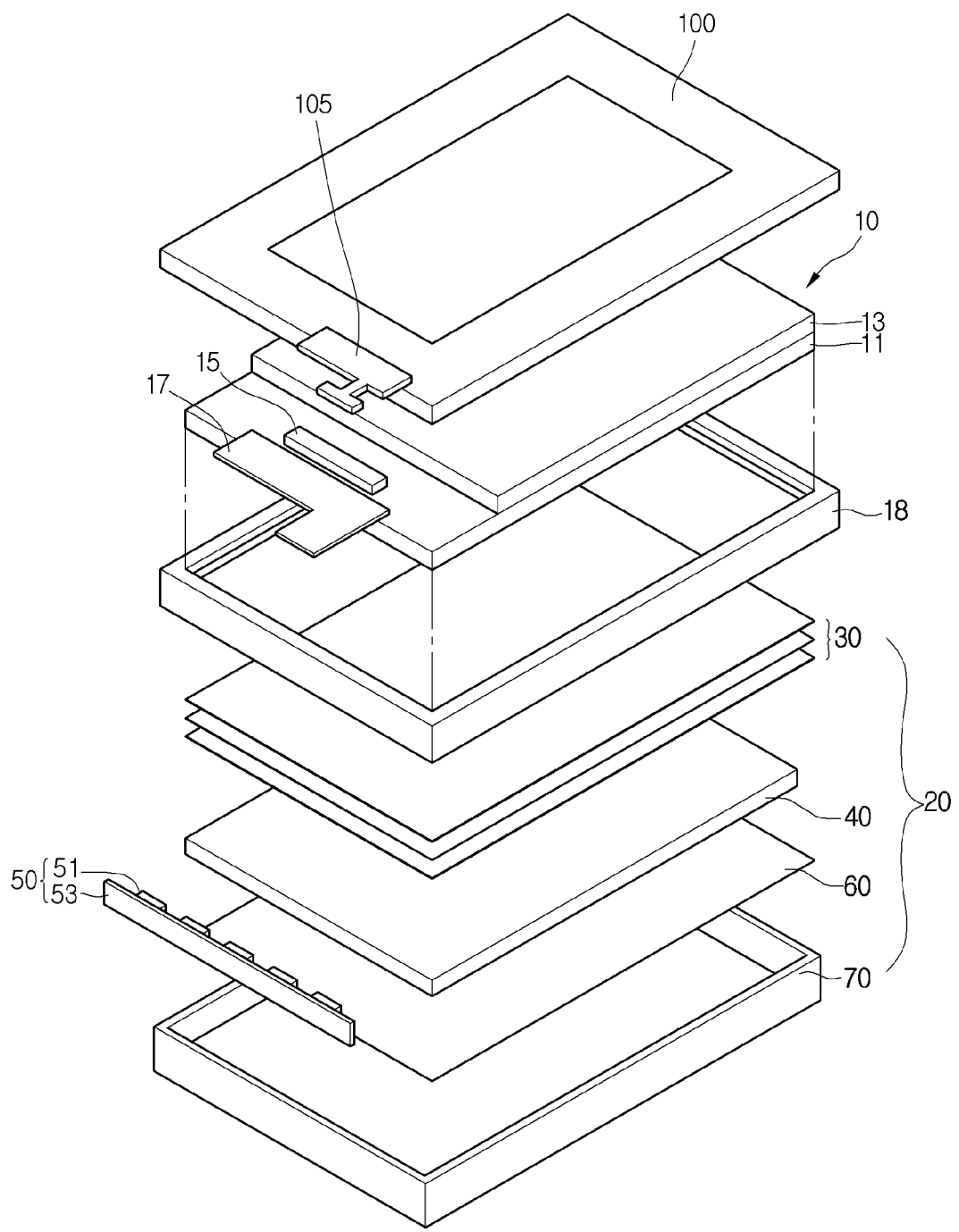
FIG. 1 is an exploded perspective view showing a touch panel and a liquid crystal display device according to a first embodiment of the present disclosure.

A touch panel according to one embodiment includes: a substrate defined into an effective area and a non-effective area; a sensing electrode formed on the substrate; an antenna formed on the substrate. The sensing electrode is selectively used in a finger touch sensing mode and a haptic driving mode.

The antenna can be used in a pen touch sensing mode.

The finger touch sensing mode, the pen touch sensing mode, and the haptic driving mode can be time-divisionally performed.

The haptic driving mode can be independently performed regardless of the finger touch sensing mode and the pen touch sensing mode.

The sensing electrode can include a first sensing electrode and a second sensing electrode crossing each other, and the antenna can include a first antenna and a second antenna crossing each other.

The first antenna can be formed in a closed loop surrounding the second sensing electrode.

The second antenna can be formed in a closed loop surrounding the first sensing electrode.

The touch panel of an embodiment can further include a bridge formed at an intersection of the first sensing electrode and the second electrode. The first sensing electrode and the second sensing electrode are formed in the same layer.

The first antenna and the second antenna can be formed in different layers from each other.

The touch panel of an embodiment can further include a jumper formed at an intersection of the second antenna and the first sensing electrode. The second antenna and the first sensing electrode are formed in the same layer.

The touch panel of an embodiment can further include a line electrode electrically connected to the sensing electrode and formed in the non-effective area.

The touch panel of an embodiment can further include an auxiliary film disposed on a front surface of the substrate The auxiliary film can include a conductive layer and an insulation layer.

A touch panel according to another embodiment includes: a substrate; a line electrode formed on the substrate; a first insulation layer formed on the substrate provided with the line electrode; a first antenna formed on the first insulation layer; a second insulation layer formed on the first insulation layer provided with the first antenna; and a second antenna, a first sensing electrode and a second sensing electrode which are formed on the second insulation layer.

The touch panel of another embodiment can further include a bridge formed on the first insulation layer opposite to an intersection of the first sensing electrode and the second sensing electrode.

The bridge can be electrically connected to the second sensing electrode through a bridge contact hole.

The touch panel of another embodiment can further include a jumper formed on the first insulation layer opposite to an intersection of the second sensing electrode and the second antenna.

The jumper can be electrically connected to the second sensing electrode through a jumper contact hole.

Reference will now be made in detail to the embodiments of the present disclosure, examples of which are illustrated in the accompanying drawings. These embodiments introduced hereinafter are provided as examples in order to convey their spirit to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is an exploded perspective view showing a touch panel and a liquid crystal display device according to a first embodiment of the present disclosure.

Referring to FIG. 1, a liquid crystal display device according to a first embodiment of the present disclosure includes a liquid crystal panel 10, a backlight unit 20 and a touch panel 100. The liquid crystal panel 10 is used to display images. The backlight unit 20 disposed under to the liquid crystal panel 10 is used to apply light to the liquid crystal panel 10. The touch panel 100 is attached to a front surface (or an upper surface) of the liquid crystal panel 10.

Also, the liquid crystal display device can include a guide panel 18 and a bottom cover 70. The guide panel 18 is used to support edges of the lower surface of the liquid crystal panel 10 and combined with the backlight unit 20. The bottom cover 70 receives the backlight unit 20.

The guide panel 18 can be formed to have an opened central area. As such, the guide panel 18 can transfer light from the backlight unit 20 to the liquid crystal panel 10. For example, the guide panel 18 can be formed in a tetragonal rimmed shape. Also, the guide panel 18 can be formed from a mold material.

The liquid crystal panel 10 includes a thin film transistor substrate 11, a color filter substrate 13 and a liquid crystal layer (not shown). The liquid crystal layer is interposed between the thin film transistor substrate 11 and the color filter substrate 13.

The thin film transistor substrate 11 can be formed to have a larger size than that of the color filter substrate 13. The color filter substrate 13 can be combined with the thin film transistor substrate 11 in such a manner as to expose a part of the thin film transistor substrate 11. At least one driver IC (integrated circuit) chip 15 can be loaded on the exposed thin film transistor substrate 11. The at least one driver IC chip 15 can apply signals to gate and data lines which are formed on the thin film transistor substrate 11. Also, the at least one IC chip 15 can include a gate driver and a data driver. Moreover, the driver IC chip 15 can include a timing controller.

A first flexible printed circuit board 17 can be attached to the exposed thin film transistor substrate 11. The first flexible printed circuit board 17 can be electrically connected to the driver IC chip 15. Also, the first flexible printed circuit board 17 can be formed from a bendable or foldable material. Such a first flexible printed circuit board 17 can be attached to the thin film transistor substrate 11 by means of an anisotropic conductive film (ACF), and electrically connected to the driver IC chip 15.

The touch panel 100 can be disposed on the front surface (or the upper surface) of the liquid crystal panel 10. Also, the touch panel 100 can be attached to the front surface of the liquid crystal panel 10. In detail, the touch panel 100 can be attached to a front surface (an upper surface) of the color filter substrate 13. A second flexible printed circuit board 105 for the touch panel 100 can be attached to the touch panel 100. The touch panel 100 can sense a touch input of a user and apply the sensed touch input to a touch driver chip (not shown) via the second flexible printed circuit board 105. Such a touch panel 100 will be described in detail later.

The backlight unit 20 can include optical sheets 30, a light guide plate 40, a light source 50 and a reflective sheet 60.

The optical sheets 30 are interposed between the liquid crystal panel 10 and the light guide plate 40. Also, the optical sheets 30 are used to converge and diffuse light, which is applied from the light source 50 through the light guide plate 40, and to transfer converged and diffused light to the liquid crystal panel 10. Such optical sheets 30 can include at least one prism sheet and a diffusion sheet.

The light guide plate 40 can be disposed under the optical sheets 30. The light guide plate 40 disposed under the optical sheets 30 converts incident light from the light source 50 into two-dimensional light and outputs two-dimension light toward the liquid crystal panel 10. Such a light guide plate 40 can be formed one selected from a material group which includes PMMA (polymethylmethacrylate), a vinyl chloride resin, an acrylic based resin, a PC (polycarbonate) based resin, a PET (polyethylene terephthalate) based resin, a PE (polyethylene) based resin, a PS (polystyrene) based resin, a PP (polypropylene) based resin, a PI (polyimide) based resin, glass, silica and so on.

The light source 50 can include a plurality of light emitting diodes 51 and a printed circuit board 53.

The light emitting diodes 51 are loaded on the printed circuit board 53. Also, the light emitting diodes 51 each receive a driving voltage applied from the printed circuit board 53 and each emit light toward the light guide plate 40.

The printed circuit board 53 can receive the driving voltage from an external driver (not shown). Also, the printed circuit board 53 can apply the received driving voltage to the light emitting diodes 51.

The reflective sheet 60 can be interposed between the light guide plate 40 and the bottom cover 70. Also, the reflective sheet 60 can reflect light from the light guide plate 40 and allow reflected light to progress toward the light guide plate 40 and the liquid crystal panel 10.

Although it is shown in the drawing that the touch panel 100 is attached to the liquid crystal panel 10 as an example, the present disclosure is not limited to this. Alternatively, the touch panel 100 can be attached to and used in one of display devices including a plasma display panel (PDP), an organic light emitting display (OLED) device and so on.

Figure 2A:
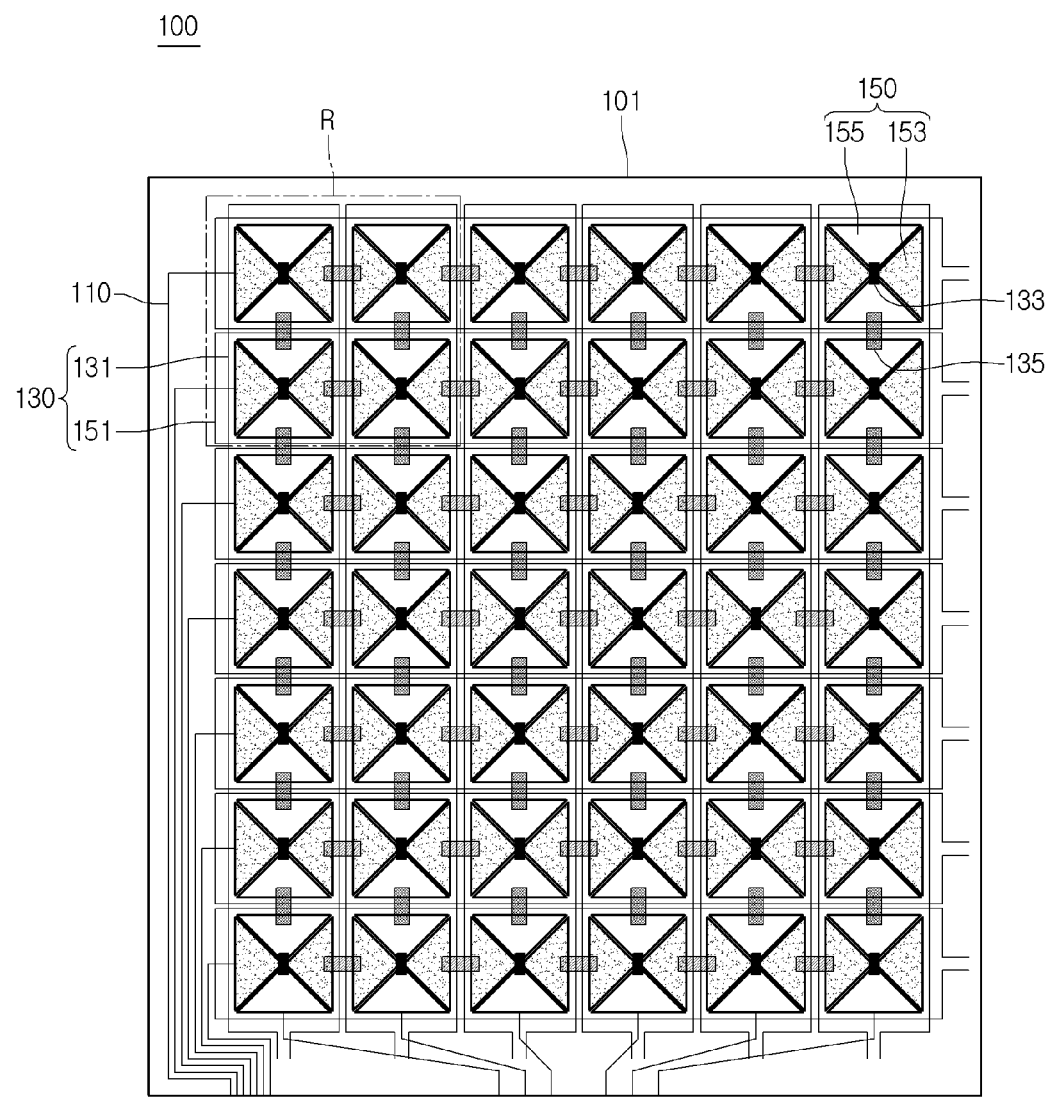
FIGS. 2A and 2B are planar views showing a touch panel according to the first embodiment of the present disclosure.
Figure 2B:
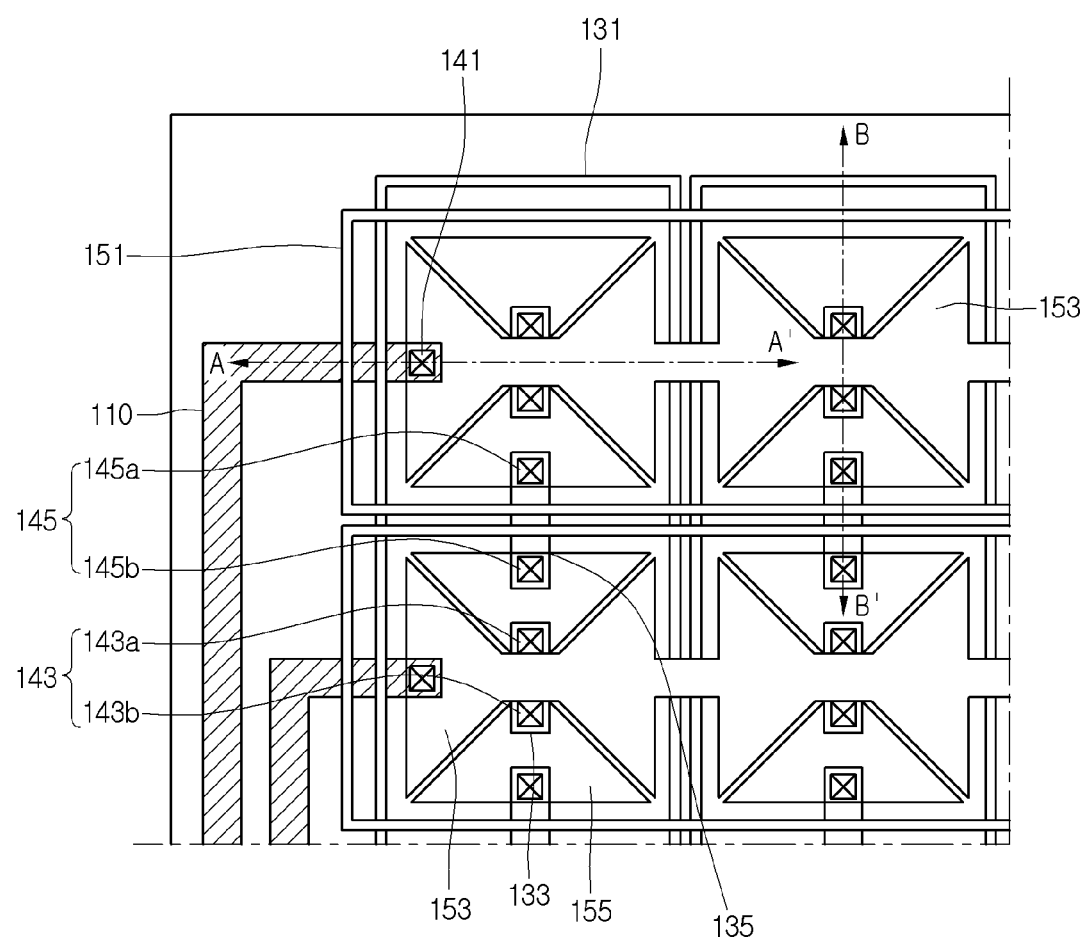
Figure 3A:
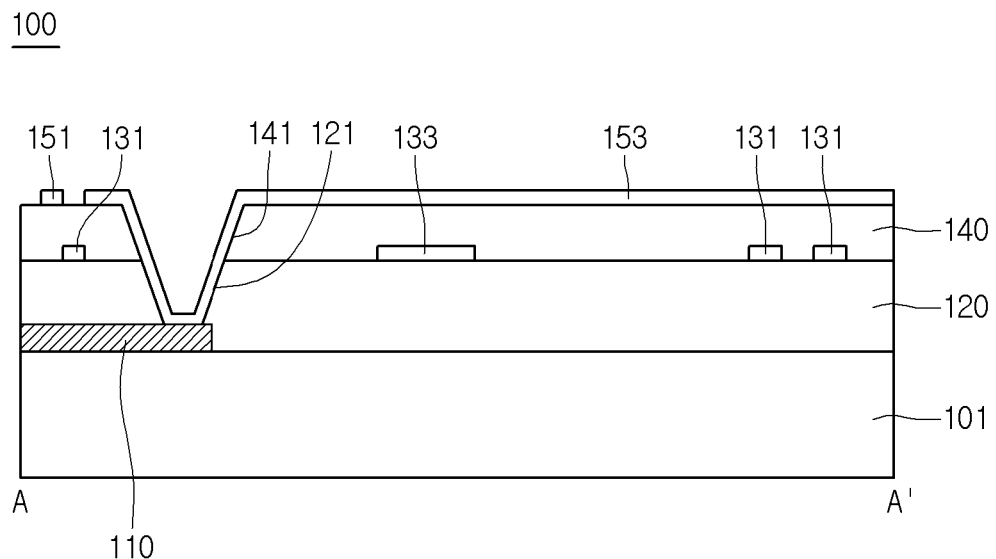
FIG. 3A is a cross-sectional view showing the touch panel taken along a line A-A' in FIG. 2B.
Figure 3B:
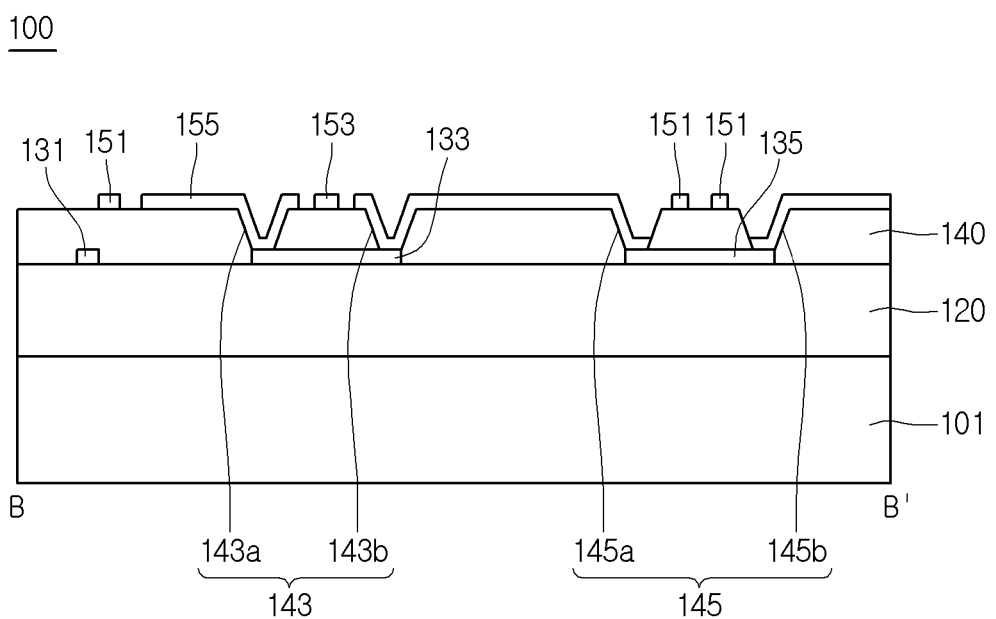
FIG. 3B is a cross-sectional view showing the touch panel taken along a line B-B' in FIG. 2B.

FIG. 2A is planar views showing a touch panel according to a first embodiment of the present disclosure. FIG. 2B is a planar view showing a portion R in FIG. 2A. FIG. 3A is a cross-sectional view showing the touch panel taken along a line A-A' in FIG. 2B. FIG. 3B is a cross-sectional view showing the touch panel taken along a line B-B' in FIG. 2B.

Referring to FIGS. 2A, 2B, 3A, and 3B, the touch panel 100 can be defined into an effective area and a non-effective area.

The effective area of the touch panel 100 is used to input a command through a touch of user. The non-effective area of the touch panel 100 corresponds to the circumference of the effective area. The non-effective area cannot be activated even though a touch of a user is generated. As such, any command cannot be input through the non-effective area.

When the touch panel 100 is attached to the liquid crystal panel 10, the effective area and the non-effective area of the touch panel 100 can be opposite to a display area and a non-display area of the liquid crystal display device. The display area is used to display images, and the non-display area cannot display any image. As such, the effective area of the touch panel 100 must become a light transmission area, but the non-effective area of the touch panel 100 can be a light interception area.

The touch panel includes a substrate 101. Line electrodes 110, antennas 130 and sensing electrodes 150 can be formed on the substrate 101.

The sensing electrodes 150 can be arranged in the effective area. The effective area cannot be limited to one of both surfaces of the substrate 101. In other words, the effective area can also include one of both surface of another substrate or one of both surfaces of a cover substrate, which overlaps with the effective area of the substrate 101.

Each of the sensing electrodes 150 can include a first sensing electrode 153 and a second sensing electrode 155. The first sensing electrode 153 can be formed in a first direction (i.e., a horizontal direction). The second sensing electrode 155 can be formed in a second direction (i.e., a vertical direction) crossing the first direction.

The first sensing electrode 153 and the second sensing electrode 155 can be formed in the same layer. A bridge 133 can be formed at an intersection (i.e., crossing) of the first and second sensing electrodes 153 and 155.

The bridge 133 can be formed in a different layer from the first and second sensing electrodes 153 and 155. In this case, the bridge 133 can be electrically connected to the second sensing electrode 155 through a bridge contact hole 143. As such, the second sensing electrodes 155 can be connected to one another in the second direction via the bridge 133. In accordance therewith, the first sensing electrode 153 and the second sensing electrode 155 can be form in the same layer.

The sensing electrode 150 can be electrically connected to one of the line electrodes 110. The line electrodes 110 can be formed in the non-effective area.

The line electrodes 110 can be electrically connected to the second flexible printed circuit board 105 of the touch panel 100. The line electrodes 110 connected to the second flexible printed circuit board 105 can exchange signals with the second flexible printed circuit board 105. As such, the sensing electrodes 150 electrically connected to the line electrodes 110 can exchange signals with the second flexible printed circuit board 105.

The antennas 130 can be arranged in the effective area. The antennas 130 are for sensing a pen touch. The antennas 130 can be formed to surround each of the sensing electrodes 150. In other words, the antennas 130 can be formed in a closed loop shape. Such antennas 130 can include first antennas 131 and second antennas 151.

The first antenna 131 can be lengthily formed in the second direction (i.e., the vertical direction). The second antenna 151 can be lengthily formed in the first direction (i.e., the horizontal direction).

The first antenna 131 can be formed in a closed loop shape surrounding the first sensing electrodes 153. The second antenna 151 can be formed in another closed loop shape surrounding the second sensing electrodes 155.

The first antennas 131 and the second antennas 151 can be formed in different layers from each other. The first antennas 131 can be formed in the same layer as the bridges 133. The second antennas 151 can be formed in the same layer as the sensing electrodes 150. Generally, the sensing electrode and a portion of the antenna are formed with a substantially same vertical distance from the substrate 101. For example, in FIGS. 3A and 3B the first sensing electrode 153, the second sending electrode 155, and the second antenna 151 (the portion of the antenna) are formed with a substantially same vertical distance from the substrate.

The first antenna 131 can cross the first sensing electrodes 153. Also, the first antenna 131 is electrically separated from the first sensing electrodes 153 because the first antenna 131 and the first sensing electrode 153 are formed in different layers from each other.

The second antenna 151 can cross the second sensing electrodes 155. Jumpers 135 can be formed at intersections of the second antenna 151 and the second sensing electrodes 155.

The jumpers 135 can be formed in still another layer different from the second antenna 151 and the second sensing electrode 155. Meanwhile, the jumpers 135 can be formed in the same layer as the first antenna 131 and the bridge 133.

The second sensing electrode 155 can be electrically connected to the jumper 135 through a jumper contact hole 145. As such, the second sensing electrodes 155 can be connected one another in the second direction via the jumpers 135. In accordance therewith, the second sensing electrode 155 and the second antenna 151 can be formed in the same layer.

The antennas 130 can be electrically connected to the second flexible printed circuit board 105 for the touch panel 100. The antennas 130 connected with the second flexible printed circuit board 105 can exchange signals with the second flexible printed circuit board 105.

FIGS. 4 through 8 are views illustrating a method of fabricating a touch panel according to a first embodiment of the present disclosure.

Figure 4A:
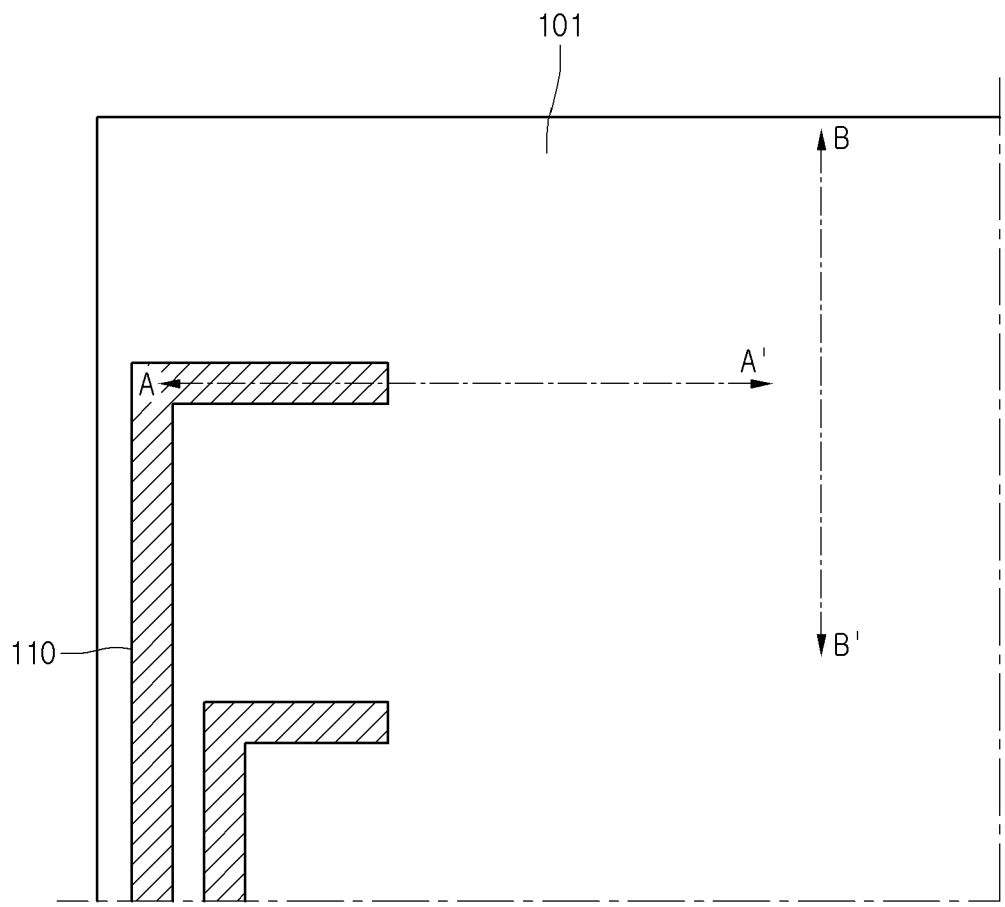
FIGS. 4A through 4C are views illustrating a method of fabricating a touch panel according to a first embodiment of the present disclosure.
Figure 4B:
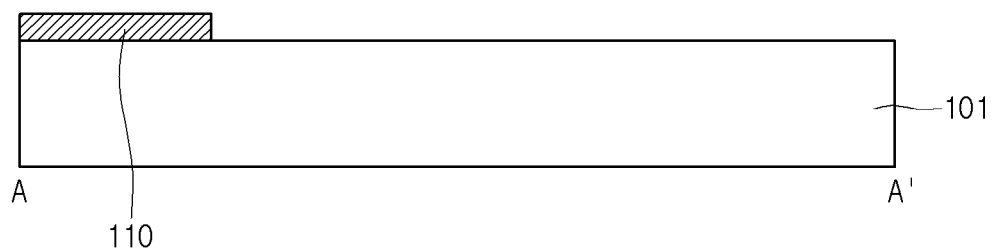
Figure 4C:
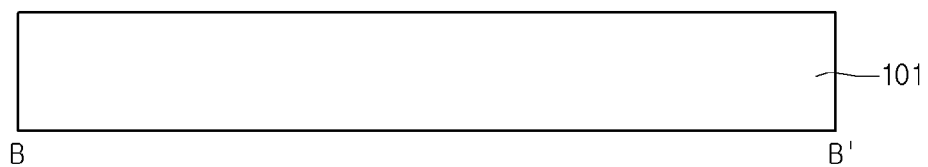

Referring to FIGS. 4A through 4C, the fabrication method of the touch panel according to a first embodiment forms line electrodes 110 on a substrate 101.

The line electrodes 110 can be disposed in the non-effective area of the touch panel 100. Also, the line electrodes 110 can be electrically connected to the second flexible printed circuit board 105 for the touch panel 100.

The line electrodes 110 can be formed from a metal material such as copper, silver or others. Alternatively, the line electrodes 110 can be formed from at least one selected from a conductive material which includes indium-tin-oxide ITO, copper oxide, carbon nano tube CNT, silver nano wire and so on.

The line electrode 110 disposed in the non-effective area does not need to have a transparent property.

Figure 5A:
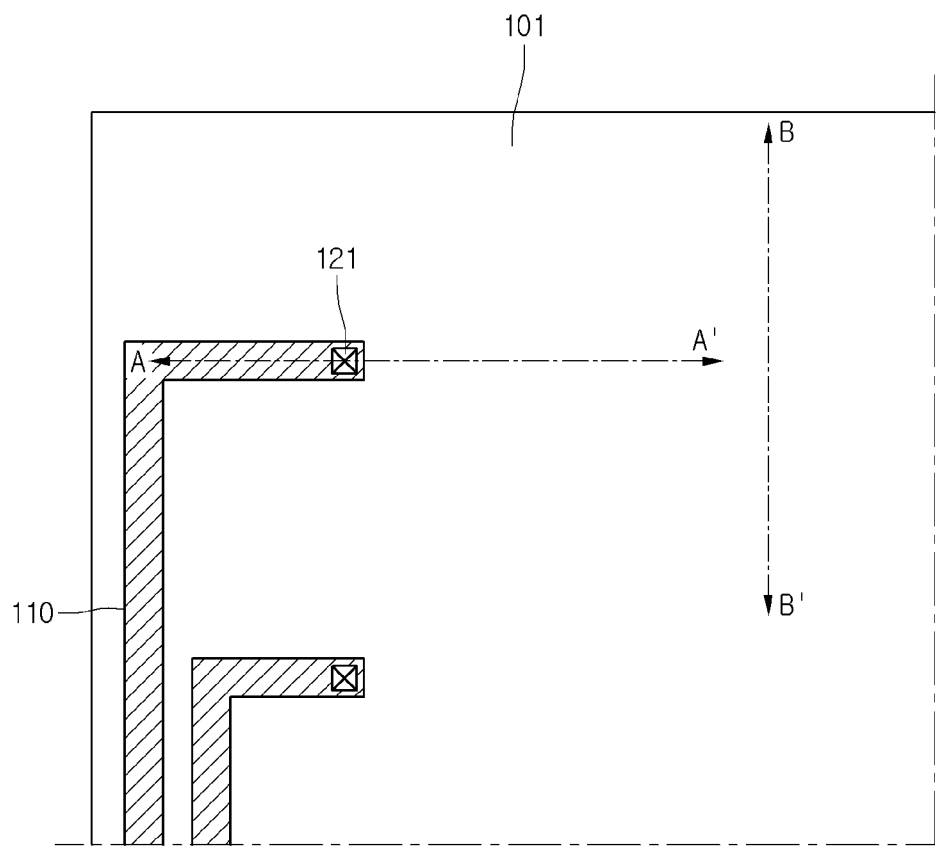
FIGS. 5A through 5C are views illustrating a method of fabricating a touch panel according to a first embodiment of the present disclosure.
Figure 5B:
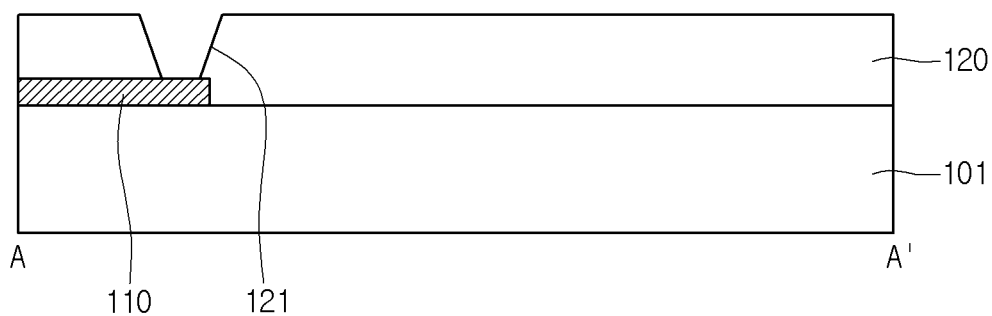
Figure 5C:
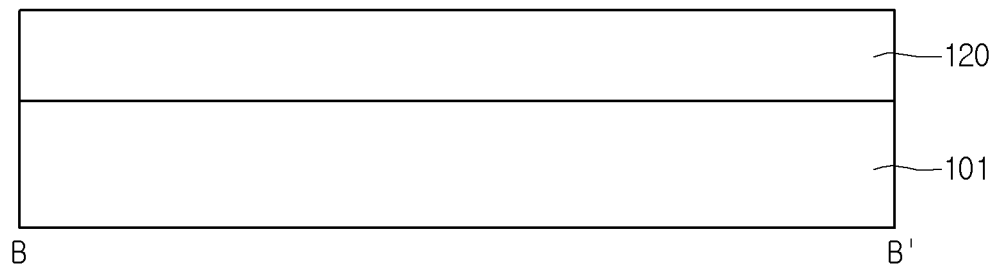

As shown in FIGS. 5A through 5C, a first insulation layer 120 is coated on the entire surface of the substrate 101 provided with the line electrodes 110.

The first insulation layer 120 is used to electrically insulate the line electrodes 110 from other electrodes and/or wirings. As such, the first insulation layer 120 must have an insulation property. Such a first insulation layer 120 can be formed from one of an inorganic insulation material or an organic insulation material. The inorganic insulation material can include silicon nitride SiNx, silicon oxide SiOx and so on. The organic insulation material can include BCB (benzocyclobutene) and so on.

Wiring contact holes 121 can be formed in the first insulation layer 120 opposite to the line electrodes 110. The first wiring contact hole 121 can be formed in such a manner as to penetrate through the first insulation layer 120. As such, the first wiring contact hole 121 can partially expose a portion of the line electrode 110.

Figure 6A:
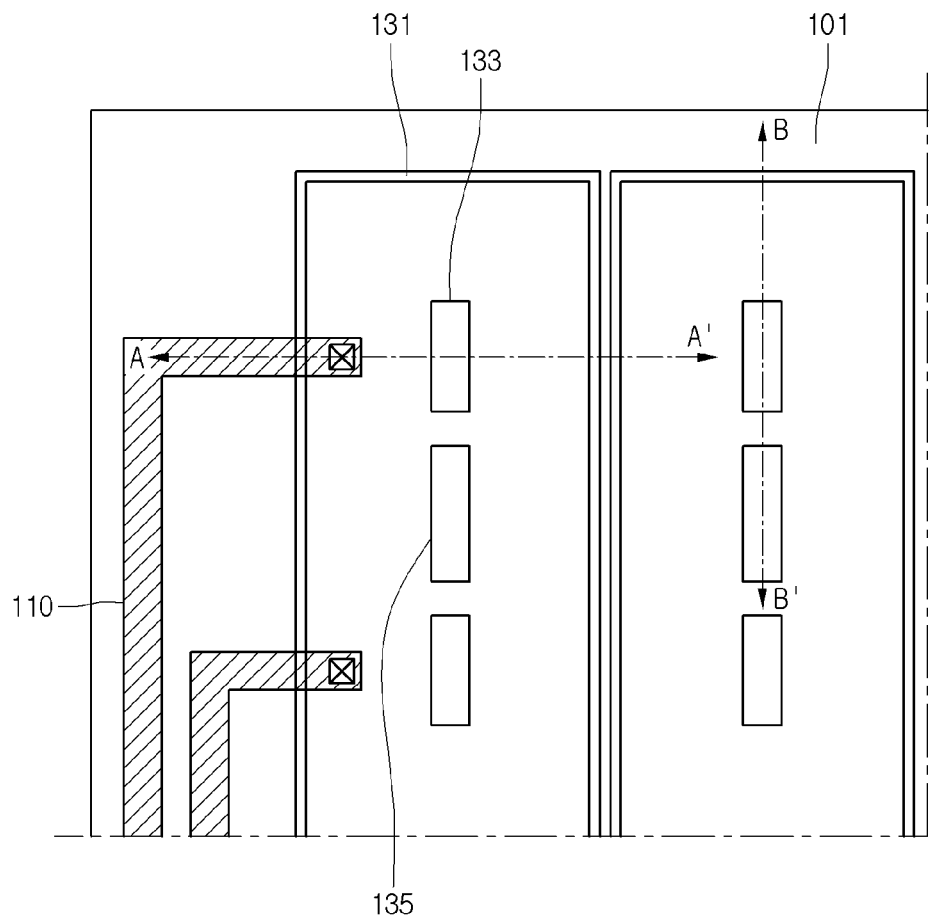
FIGS. 6A through 6C are views illustrating a method of fabricating a touch panel according to a first embodiment of the present disclosure.
Figure 6B:
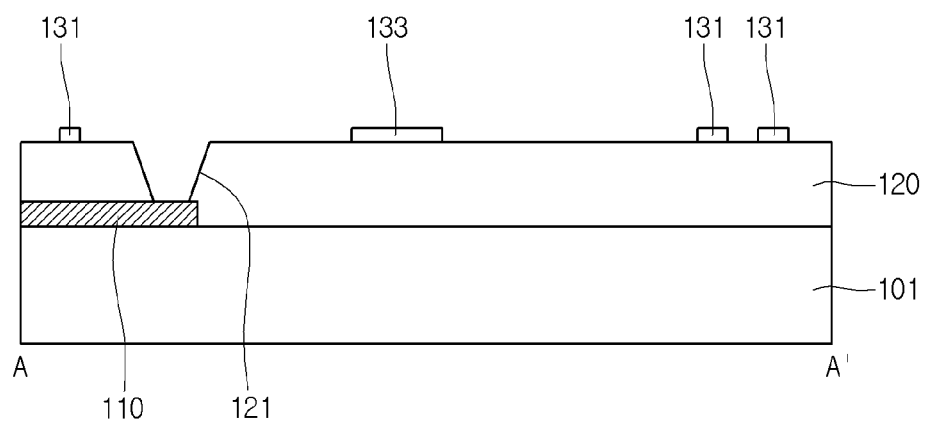
Figure 6C:
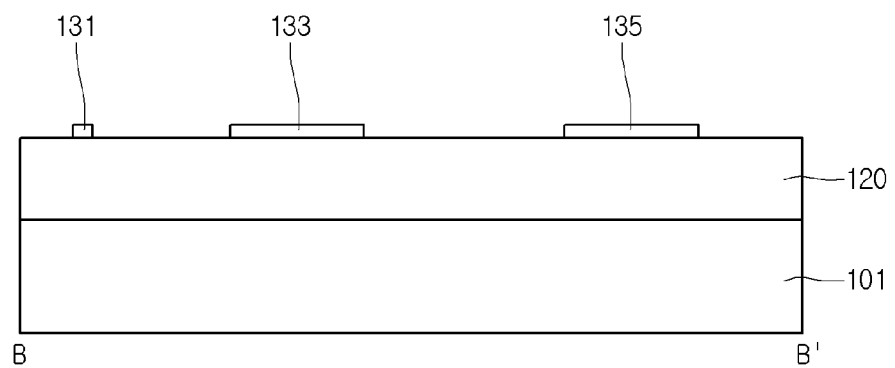

Referring to FIGS. 6A through 6C, first antennas 131, bridges 133 and jumpers 135 can be formed on the first insulation layer 120.

The first antenna 131 can be lengthily formed in the second direction in which the second sensing electrodes 155 are arranged. The first antenna 131 can be formed in a closed loop shape which surrounds the second sensing electrodes 155.

Each of the bridge 133 can be formed at an intersection of the first sensing electrode 153 and the second sensing electrode 155.

Each of the jumpers 135 can be formed at an intersection of the second antenna 151 and the sensing electrode 155.

The first antennas 131, the bridges 133 and the jumpers 135 can be formed from a transparent conductive material. For example, the first antennas 131, the bridges 133, and the jumpers 135 can be formed from a metal material such as copper Cu, silver Ag or others. Alternatively, the first antennas 131, the bridges 133, and the jumpers 135 can be formed from at least one selected from a conductive material group which includes indium-tin-oxide ITO, copper oxide, carbon nano tube CNT, silver nano wire and so on.

Figure 7A:
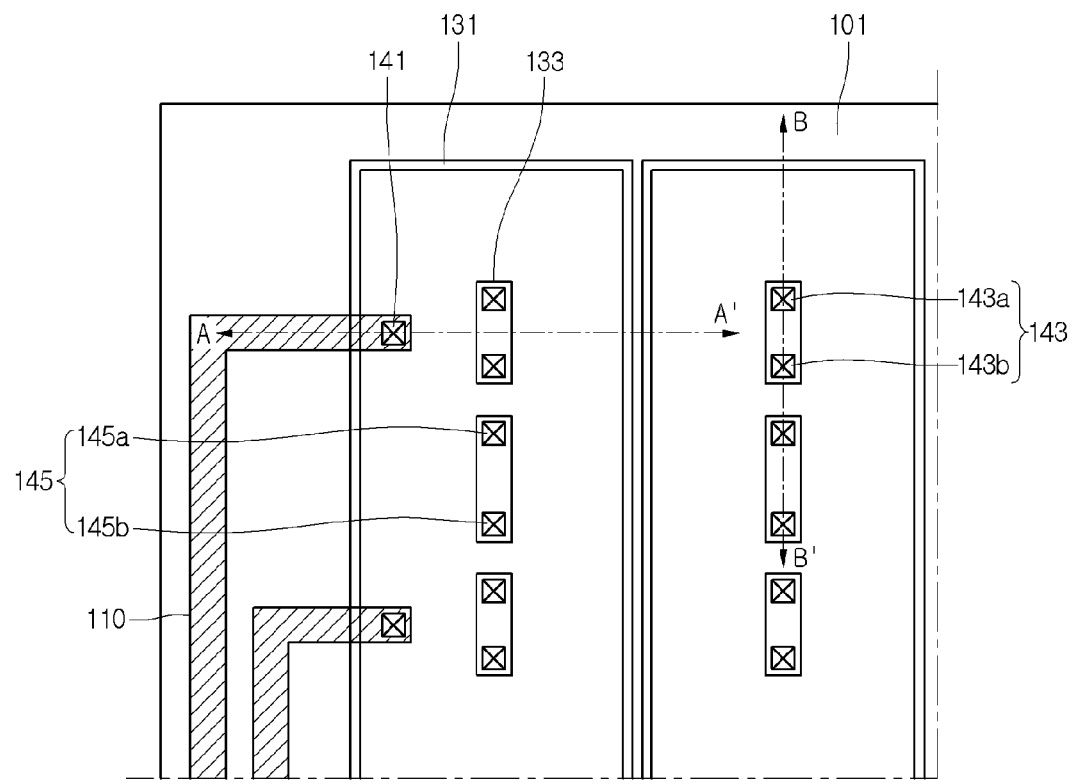
FIGS. 7A through 7C are views illustrating a method of fabricating a touch panel according to a first embodiment of the present disclosure.
Figure 7B:
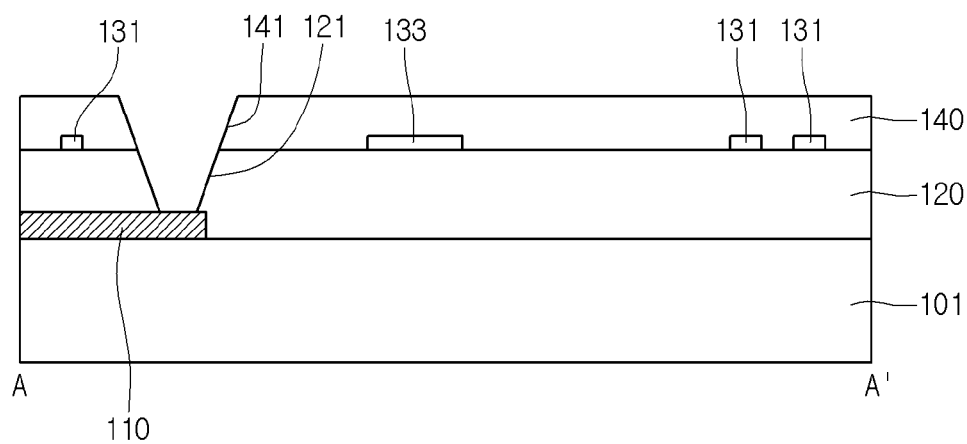
Figure 7C:
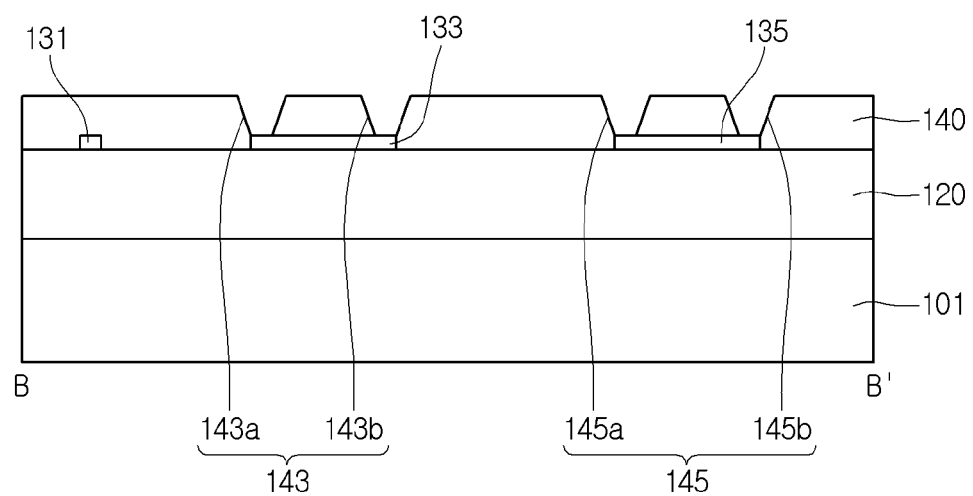

As shown in FIGS. 7A through 7C, a second insulation layer 140 can be formed on the first insulation layer 120 provided with the first antennas 131, the bridges 133 and the jumpers 135.

The second insulation layer 140 is used to electrically insulate the first antennas 131, the bridges 133, and the jumpers 135 from other electrodes and other wirings. As such, the second insulation layer 140 must have an insulation property. Such a second insulation layer 140 can be formed from one of an inorganic insulation material and an organic insulation material. The inorganic insulation material can include silicon nitride SiNx, silicon oxide SiOx and so on. The organic insulation material can include BCB (bensocyclobutene).

Second wiring contact holes 141, bridge contact holes 143 and jumper contact holes 145 can be formed in the second insulation layer 140.

The second wiring contact holes 141 can be formed in the second insulation layer 140 corresponding to the first wiring contact holes 121. The second wiring contact holes 141 can be formed in such a manner as to penetrate through the second insulation layer 140. As such, each of the line electrodes 110 can be exposed through the respective first wiring contact hole 121 and the respective second wiring contact hole 141.

The bridge contact holes 143 can be formed in the second insulation layer 140 over a portion of the bridges 133. Each of the bridge contact hole 143 can include a first bridge contact hole 143a and a second bridge contact hole 143b. The first and second bridge contact holes 143a and 143b can be formed along the second direction in the second insulation layer 140 opposite to the bridge 133.

The bridge contact hole 143 can be formed in such a manner as to penetrate through the second insulation layer 140. The bridge contact hole 143 can expose a portion of the respective bridge 133.

The jumper contact holes 145 can be formed in the second insulation layer 140 over a portion of the jumpers 135. Each of the jumper contact holes 145 can include a first jumper contact hole 145a and a second jumper contact hole 145b. The first and second jumper contact holes 145a and 145b can be formed along the second direction in the second insulation layer 140 over a portion of the respective jumper 135.

The jumper contact holes 145 can be formed in such a manner as to each penetrate through the second insulation layer 140. As such, the jumpers 135 can be exposed by the respective jumper contact holes 145.

Figure 8A:
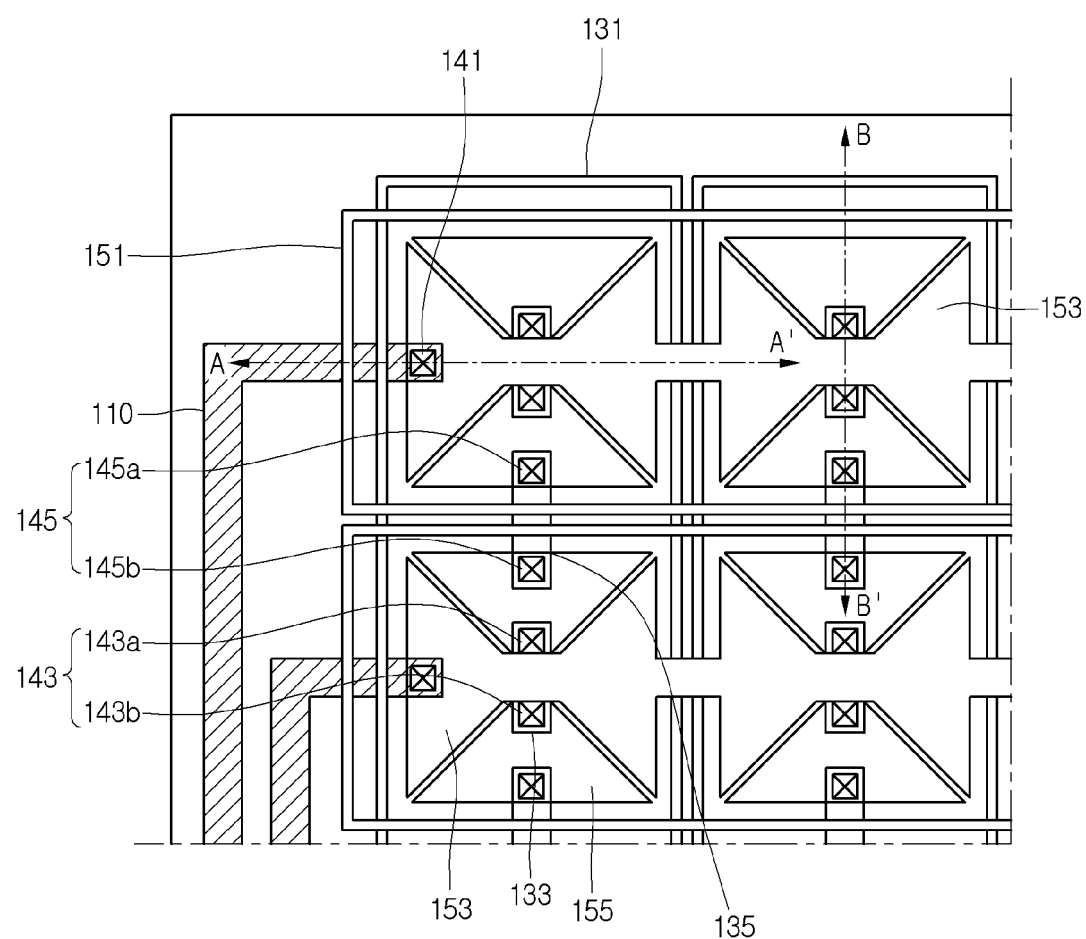
FIGS. 8A through 8C are views illustrating a method of fabricating a touch panel according to a first embodiment of the present disclosure.
Figure 8B:
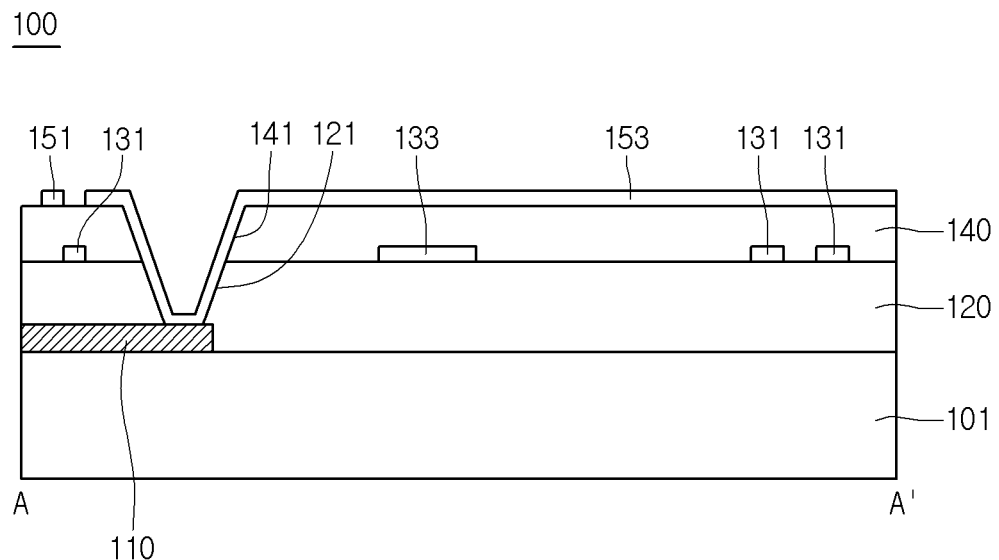
Figure 8C:
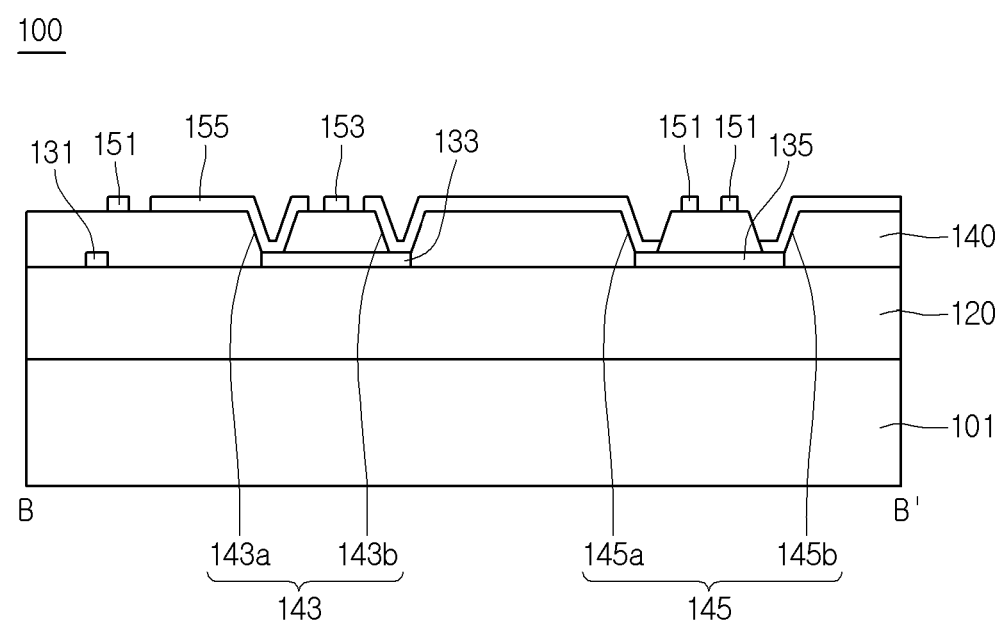

Referring to FIGS. 8A through 8C, second antennas 151 and sensing electrodes 150 can be formed on the second insulation layer 140. Each of the sensing electrodes 150 can include a first sensing electrode 153 and a second sensing electrode 155.

The first sensing electrode 153 can be formed along the first direction. Also, the first sensing electrode 153 can be formed in an inner side of the second antenna 151.

The second sensing electrode 155 can be formed along the second direction. In other words, the second sensing electrode 155 can be formed along a direction crossing the first sensing electrode 153. Also, the second sensing electrode 155 can be formed in an inner side of the first antenna 131.

The first sensing electrode 153 and the second sensing electrode 155 can cross each other over the respective bridge 133. The second sensing electrode 155 can be electrically connected to the respective bridge 133 through the respective bridge contact hole 143.

The second sensing electrodes 155 can be continuously connected to one another in the second direction through the brides 133. As such, the first sensing electrodes 153 can be formed in the same layer as the second sensing electrodes 155.

Each of the second antennas 151 can be lengthily formed in the first direction. Each of the second antennas 151 can be formed in a closed loop surrounding the first sensing electrodes 153.

The second antenna 151 and the second sensing electrode 155 can cross each other over the jumpers 135. The second sensing electrode 155 can be connected to the respective jumper 135 through the respective jumper contact hole 145.

The second sensing electrodes 155 and the second antennas 151 can be formed in the same layer, because the second sensing electrodes are be connected to one another in the second direction through the jumpers 135.

In this manner, the touch panel according a first embodiment of the present disclosure allows the sensing electrodes 150 for performing a haptic function and a finger touch sensing function to be formed on the same substrate as the antennas 130 for sensing a pen touch. As such, thickness and weight of the touch panel can be reduced.

Also, fabrication costs of the touch panel can be reduced, as the sensing electrodes 150 and the antennas 130 are formed on the same substrate.

Moreover, the touch panel of the present disclosure can largely not only reduce mutual signal interference but also enhance touch detection sensitivity, compared to that of the related art with the sensing electrode and the antenna which are formed on different substrates.

Figure 9:
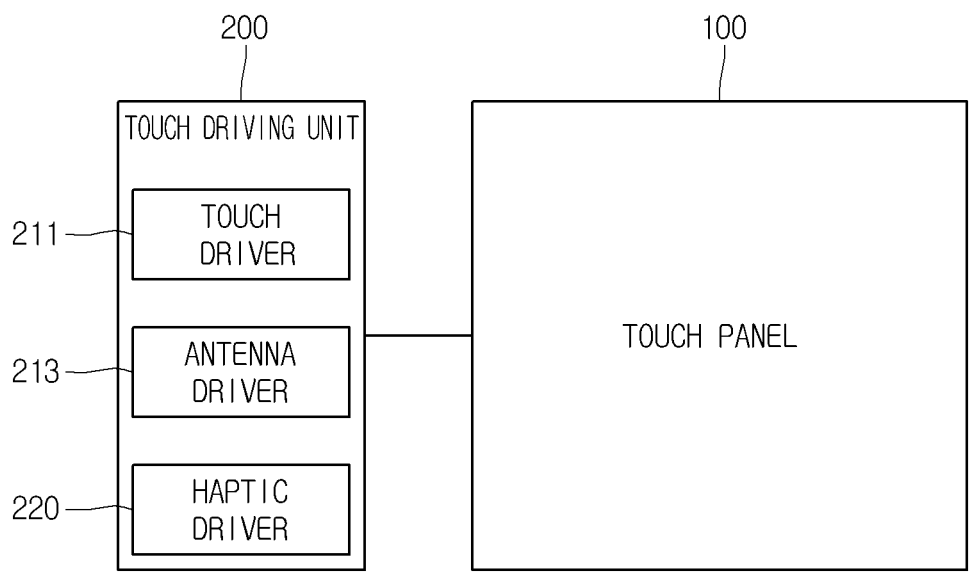
FIG. 9 is a block diagram showing a touch panel according to a first embodiment of the present disclosure.

FIG. 9 is a block diagram showing a touch panel device according to a first embodiment of the present disclosure.

Referring to FIG. 9, the touch panel 100 can be connected to a touch driving unit 200.

The touch driving unit 200 can be mounted on the second flexible printed circuit board 105 for the touch panel 100. Alternatively, the touch driving unit 200 can be loaded on another printed circuit board which is separated from the second flexible printed circuit board 105.

Such a touch driving unit 200 can include a touch driver 211, an antenna driver 213 and a haptic driver 220.

The touch driving 211 and the haptic driver 220 can be electrically connected to the sensing electrodes 150. In detail, the touch driving 211 and the haptic driver 220 can be electrically connected to the sensing electrodes 150 via the line electrodes 110.

The touch driving 211 senses a variation of the capacitance of the sensing electrodes 150 which is caused by a touch of a finger, and detects a touch position of the finger.

The haptic driver 220 applies a signal to the sensing electrodes 150 and electrifies the sensing electrodes 150. In accordance therewith, a tactile sense can be generated with respect to an object which touches the front surface of the touch panel 100. The object may be a finger or a stylus pen.

The antenna driver 213 can be electrically connected to the antennas 130. The antenna driver 213 applies a current signal to the antennas 130. As such, the antennas 130 generate magnetic fields in response to the current signal applied from the antenna driver 213.

If a pen touches the front surface of the touch panel 100, the magnetic field generated by the antenna 130 is varied. As such, the antenna driver 213 can sense the variation of the magnetic field in the antenna 130 and detect a touch position of the pen.

Figure 10A:
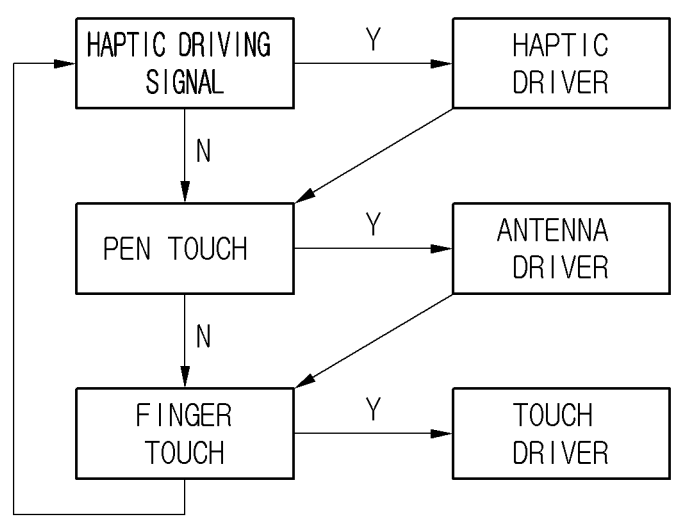
FIGS. 10A and 10B are diagrams illustrating a method of driving a touch panel according to a first embodiment of the present disclosure.
Figure 10B:
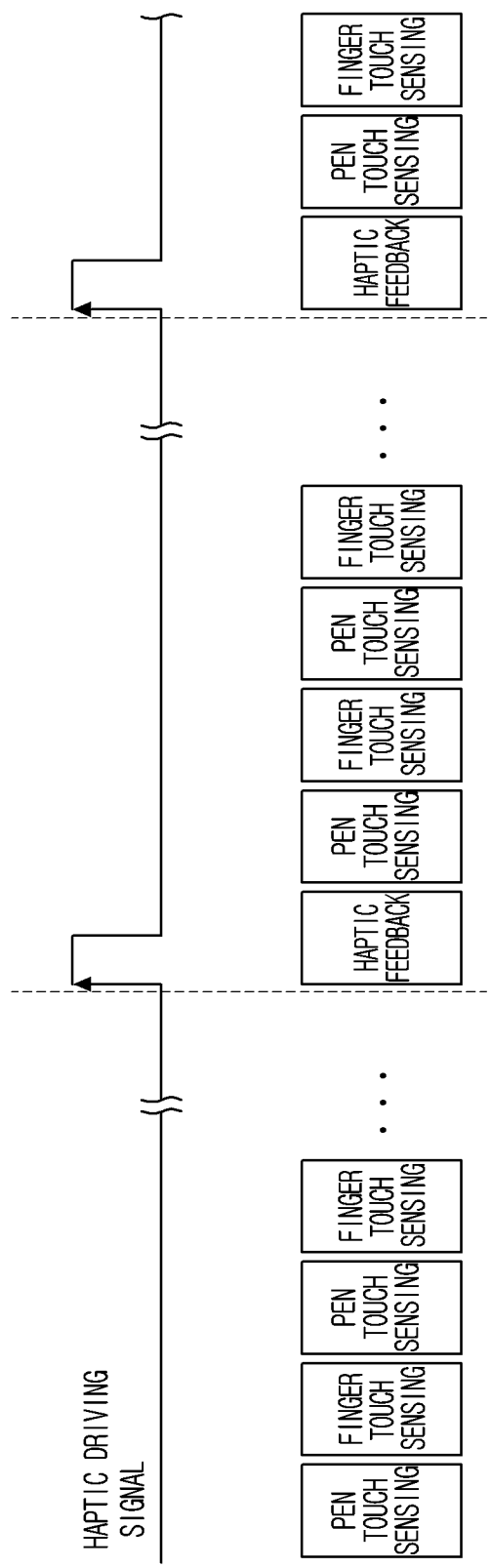

FIGS. 10A and 10B are diagrams illustrating a method of driving a touch panel according to a first embodiment of the present disclosure.

Referring to FIGS. 10A and 10B, the touch panel of the first embodiment can be sequentially driven in a haptic driving mode, a pen touch sensing mode and a finger touch sensing mode.

The haptic driving mode must be performed under the control of the touch driving unit 200, only when it is necessary. The pen touch sensing mode and the finger touch sensing mode must be always performed.

If a haptic driving signal has a low level, the haptic driver 220 cannot be driven and only the touch driver 211 and the antenna driver 213 can be driven.

When the haptic driving signal has the low level, the touch driver 211 for sensing a finger touch and the antenna driver 213 for sensing a pen touch are alternately driven.

If the haptic driving signal has a high level, the haptic driver 220 is driven instead of the touch driver 211 and the antenna driver 213 which are driven alternately to each other. In this time, the haptic driver 220 applies a signal to the sensing electrodes 150 and enables a tactile sense to be generated in the front surface of the touch panel 100.

When the haptic driving signal is transitioned from the high level to the low level, the touch driver 211 and the antenna driver 213 are alternately driven again. During a time period between the haptic driving signal transitioning from the high level to the low level and a subsequent haptic driving signal, the haptic driver 220 is driven only once and the touch driver 211 and the antenna driver 213 are alternatively driven a different number of times according to one embodiment. For example, the antenna driver 213 is driven a greater number of times than the touch driver 211. In another embodiment, during a time period between the haptic driving signal transitioning from the high level to the low level and a subsequent haptic driving signal, the haptic driver 220 is driven only once and the touch driver 211 and the antenna driver 213 are alternatively driven a same number of times. In yet another embodiment during a time period between the haptic driving signal transitioning from the high level to the low level and a subsequent haptic driving signal, the haptic driver 220 and the antenna driver 213 are simultaneously driven only once and the touch driver 211 is driven only once following the driving of the antenna driver 213. In yet another embodiment during a time period between the haptic driving signal transitioning from the high level to the low level and a subsequent haptic driving signal, the haptic driver 220 is driven only once, the antenna driver 213 is driven only once following the driving of the haptic driver 220, and the touch driver 211 is driven only once following the driving of the antenna driver 213. In another embodiment, during a time period between the haptic driving signal transitioning from the high level to the low level and a subsequent haptic driving signal, the haptic driver 220 is driven only once, the touch driver 211 is driven only once following the driving of the haptic driver 220, and the antenna driver 213 is driven only once following the driving of the touch driver 211.

As the haptic driver 220, the touch driver 211 and the antenna driver 213 are time-divisionally driven, mutual signal interference between the haptic driver 220, the touch driver and the antenna driver 213 can be prevented. Also, the three functions of sensing the finger touch and the pen touch and feeding back a tactile sense can be performed by a single touch driver unit.

Figure 11A:
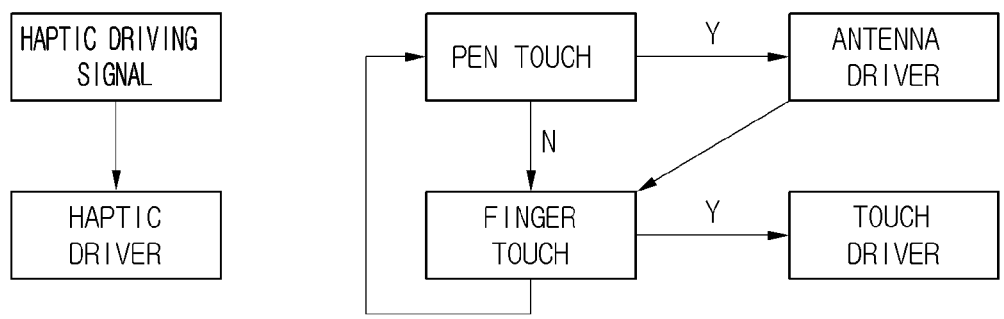

FIGS. 11A and 11B are diagrams illustrating a method of driving a touch panel according to a second embodiment of the present disclosure.

The driving method of the second embodiment is the same as that of the first embodiment with the exception of independently performing the haptic feedback. Components of the second embodiment having the same as those of the first embodiment will be referred to by the same reference numbers and names. Also, the description of the second embodiment overlapping with the first embodiment will be omitted.

Referring to FIGS. 11A and 11B, the touch panel driving method of the second embodiment alternately performs pen and finger touch sensing modes in a time divisional system. In other words, the antenna driver 213 and the touch driver 211 can be driven alternately with each other.

In order to sense the finger touch and the pen touch, the touch driver unit 200 must be always driven. To this end, the touch driver 211 and the antenna driver 213 can be driven alternately and repeatedly regardless of the haptic driving signal.

The haptic driver 220 can be driven only when the haptic driving signal has the high level. In detail, the haptic driver 220 applies a signal to the sensing electrodes 150 and generates a tactile sense on the front surface of the touch panel when the haptic driving signal has the high level.

In other words, the haptic driver 220 can be independently driven regardless of the touch driver and the antenna driver 213.

The haptic driver 220 and the touch driver 211 are commonly and electrically connected to the sensing electrodes 150. Due to this, the haptic driver 220 and the touch driver 211 cannot be simultaneously driven. As such, only the antenna driver 213 is driven when the haptic driving signal has the high level.

Because the haptic driver 220 is independently driven, an idle interval (or a blank interval) incapable of sensing the finger touch and the pen touch can be reduced or removed.

Figure 12:
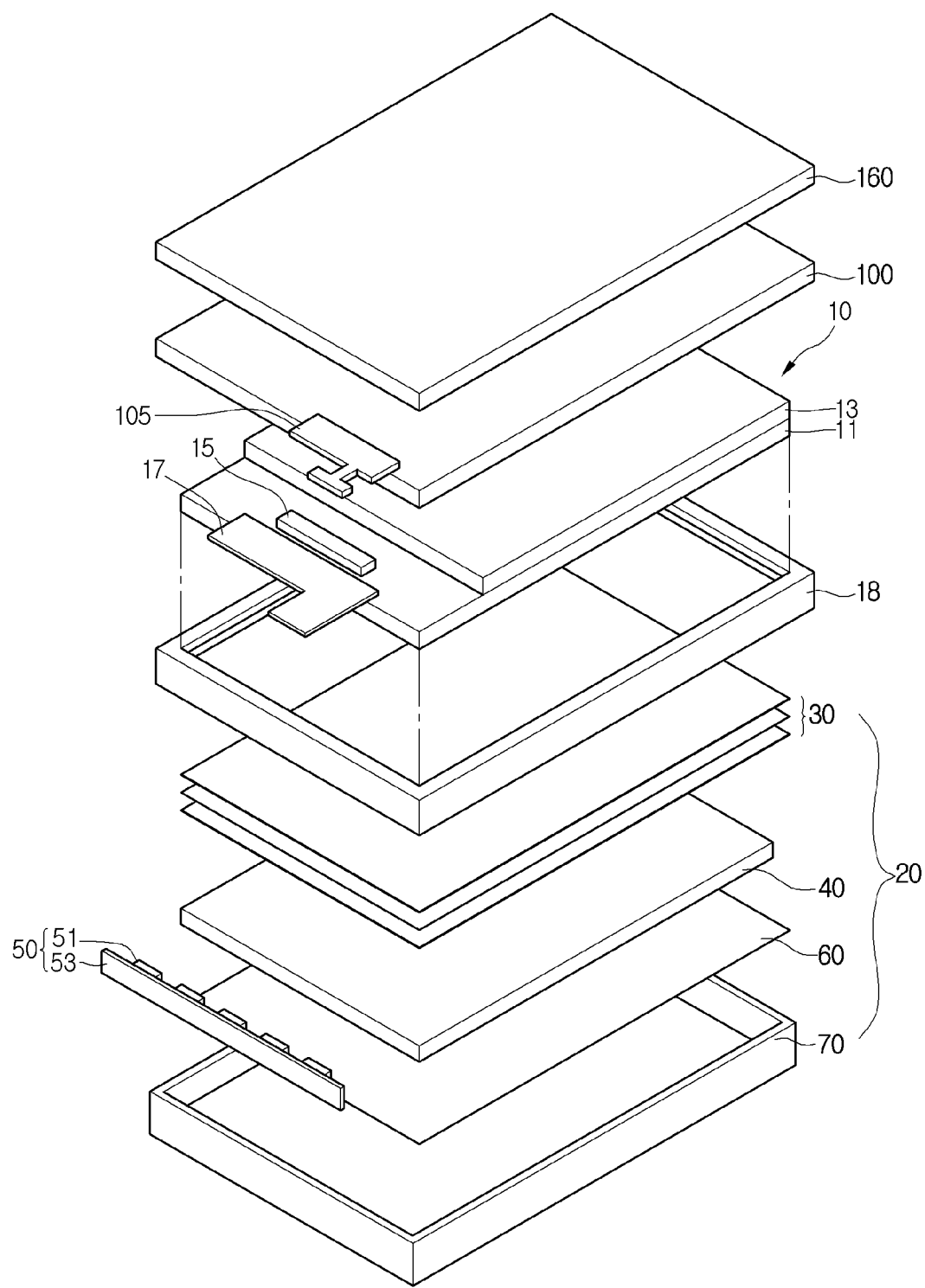
FIG. 12 is an exploded perspective view showing a touch panel and a liquid crystal display device according to a second embodiment of the present disclosure.

FIG. 12 is an exploded perspective view showing a touch panel and a liquid crystal display device according to a second embodiment of the present disclosure.

The touch panel and the liquid crystal display device according to the second embodiment have the same configuration as those of the first embodiment with the exception of an added auxiliary film. As such, components of the second embodiment having the same function and shape as those of the first embodiment will be referred to by the same reference numbers and names. Also, the description of the second embodiment overlapping with the first embodiment will be omitted.

Referring to FIG. 12, the liquid crystal display device according to a second embodiment of the present disclosure includes a liquid crystal panel 10, a backlight unit 20 and a touch panel 100. The liquid crystal panel 10 is used to display images. The backlight unit 20 disposed under to the liquid crystal panel 10 is used to apply light to the liquid crystal panel 10. The touch panel 100 is attached to a front surface (or an upper surface) of the liquid crystal panel 10.

Also, the liquid crystal display device can include a guide panel 18 and a bottom cover 70. The guide panel 18 is used to support edges of the lower surface of the liquid crystal panel 10 and combined with the backlight unit 20. The bottom cover 70 receives the backlight unit 20.

The liquid crystal panel 10 includes a thin film transistor substrate 11, a color filter substrate 13 and a liquid crystal layer interposed between the thin film transistor substrate 11 and the color filter substrate 13.

The backlight unit 20 can include optical sheets 30, a light guide plate 40, a light source 50 and a reflective sheet 60.

The touch panel 100 can be disposed on the front surface (or the upper surface) of the liquid crystal panel 10.

An auxiliary film 160 can be disposed on the front surface of the touch panel 100. The auxiliary film 160 can be attached to the front surface of the touch panel 100. In other words, one surface of the touch panel 100 can be combined with the liquid crystal panel 10 and the other surface of the touch panel 100 can be combined with the auxiliary film 160.

The auxiliary film 160 can apply a strong tactile sense to an object, which touches its front surface, in the haptic driving mode.

Figure 13:
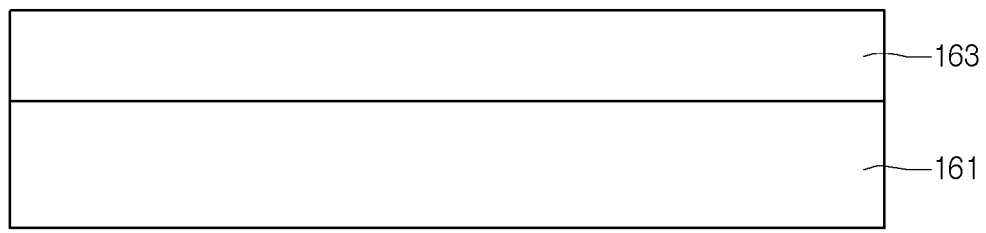
FIG. 13 is a cross-sectional view showing an auxiliary film according to a first embodiment of the present disclosure.

FIG. 13 is a cross-sectional view showing an auxiliary film according to a first embodiment of the present disclosure.

Referring to FIG. 13, an auxiliary film according to an embodiment of the present disclosure can include a conductive layer 161 and an insulation layer 163.

The conductive layer 161 can be formed from a transparent conductive material. The insulation layer 163 can be formed from a non-conductive material.

The conductive layer 161 can be attached to the touch panel 100. The insulation layer 163 can be touched by one of a finger and a pen.

If a signal is applied from the haptic driver 220 to the sensing electrodes 150, the conductive layer 161 can be charged with electric charges by the sensing electrodes 150. The electric charges charged in the conductive layer 161 can generate an electrostatic force which applies to a finger or a pen touching the outer surface of the insulation layer 163. In other words, the electric charges charged in the conductive layer 161 can generate momentary attraction and repulsion and apply a tactile sense to the touched finger or the touched pen.

The insulation layer 163 can prevent any contact of the finger or the pen with the conductive layer 161.

The touch panel 100 of the second embodiment further including the auxiliary film 160 can charge electric charges in the conductive layer 161 and generate a tactile sense. In other words, the touch panel 100 of the second embodiment can apply the electrostatic force to the finger or the pen through the thin insulation layer 163, in order to generate a tactile sense. In accordance therewith, the haptic feedback can be sensitively and efficiently performed.

As described above, the touch panels according to embodiments of the present disclosure allow the line electrode and the antenna to be formed on a single substrate. Also, the touch panels can be time-divisionally driven in the pen touch sensing mode, the finger touch sensing mode and the haptic driving mode. In accordance therewith, the touch panels can not only become thinner and lighter weight, but also reduce fabrication costs.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate;
a sensing electrode formed over the substrate, the sensing electrode configured to sense finger touch input and to provide haptic feedback; and
an antenna formed over the substrate and on a same side of the substrate as the sensing electrode, the antenna configured to receive pen touch input;
wherein a first mode in which the finger touch input is sensed on the sensing electrode, a second mode in which the haptic feedback is provided to the sensing electrode, and a third mode in which pen touch input is received from the antenna are time-divisionally performed; and
wherein the first mode and the third mode are repeated in a pre-determined order in a first period, and wherein responsive to receiving a haptic driving signal during a second period that is subsequent to the first period, the second mode is performed at a beginning of the second period followed by the first mode and the third mode repeated in the pre-determined order in the second period, the haptic driving signal being generated based on a determination of finger touch input or pen touch input in the first period.

2. The touch panel of claim 1, wherein the sensing electrode includes a first sensing electrode formed in a first direction and a second sensing electrode formed in a second direction, the first sensing electrode crossing the second sensing electrode,
wherein the second sensing electrode comprises a first portion and a second portion and wherein the first sensing electrode crosses the second sensing electrode between the first portion and the second portion of the second sensing electrode,
wherein the first sensing electrode and the second sensing electrode are formed in a same layer over the substrate, and
wherein the antenna includes a first antenna formed in the first direction and a second antenna formed in the second direction, the first antenna crossing the second antenna.

3. The touch panel of claim 2, wherein the first antenna is formed to surround the second sensing electrode and the second antenna is formed to surround the first sensing electrode.

4. The touch panel of claim 2, further comprises a bridge formed at an intersection of the first sensing electrode and the second sensing electrode.

5. The touch panel of claim 4, wherein the bridge is electrically connected to the second sensing electrode through a bridge contact hole.

6. The touch panel of claim 2, further comprises a jumper formed at an intersection of the second antenna and the first sensing electrode.

7. The touch panel of claim 1, further comprises a line electrode electrically connected to the sensing electrode and formed in a non-effective area.

8. A touch panel comprising:
a substrate;
a sensing electrode formed over the substrate, the sensing electrode configured to sense finger touch input and to provide haptic feedback; and
an antenna formed over the substrate and on a same side of the substrate as the sensing electrode, the antenna configured to receive pen touch input;
wherein the sensing electrode and a portion of the antenna are formed with a substantially same vertical distance from the substrate, and
wherein a first mode in which the finger touch input is sensed on the sensing electrode, a second mode in which the haptic feedback is provided to the sensing electrode, and a third mode in which pen touch input is received from the antenna are time-divisionally performed; and
wherein the first mode and the third mode are repeated in a pre-determined order in a first period, and wherein responsive to receiving a haptic driving signal during a second period that is subsequent to the first period, the second mode is performed at a beginning of the second period followed by the first mode and the third mode repeated in the pre-determined order in the second period, the haptic driving signal being generated based on a determination of finger touch input or pen touch input in the first period.

9. The touch panel of claim 8, wherein the antenna includes a first antenna formed in the first direction and a second antenna formed in the second direction, the first antenna crossing the second antenna.

10. The touch panel of claim 9, wherein the first antenna is formed to surround the second sensing electrode and the second antenna is formed to surround the first sensing electrode.

11. A method of a touch driver unit for driving a touch panel including a substrate, a sensing electrode formed over the substrate and configured to sense finger touch input and to provide haptic feedback, and an antenna formed over the substrate and on a same side of the substrate as the sensing electrode and configured to receive pen touch input, the method comprising:
alternatively driving a touch driver of the touch driver unit that is configured to sense touch input on the touch panel via the sensing electrode and an antenna driver of the touch driver unit that is configured to sense pen touch input via the antenna; and
responsive to either the touch input or pen touch input, driving a haptic driver of the touch driver unit that is configured to generate a signal to the sensing electrode to provide the haptic feedback;
wherein in a first mode in which the finger touch input is sensed on the sensing electrode, a second mode in which the haptic feedback is provided to the sensing electrode, and a third mode in which pen touch input is received from the antenna are time-divisionally performed; and wherein the first mode and the third mode are repeated in a pre-determined order in a first period, and wherein responsive to receiving a haptic driving signal during a second period that is subsequent to the first period, the second mode is performed at a beginning of the second period followed by the first mode and the third mode repeated in the pre-determined order in the second period, the haptic driving signal being generated based on a determination of finger touch input or pen touch input in the first period.

12. The method of claim 11, wherein driving the haptic driver of the touch driver unit comprises:

driving the haptic driver rather than the touch driver and the antenna driver responsive to either the touch input or the pen touch input.

13. The method of claim 11, wherein during a time period between generating the signal to the sensing electrode to provide the haptic feedback and generating a subsequent signal to the sensing electrode to provide the haptic feedback, the haptic driver is driven only once and the touch driver and the antenna driver are alternatively driven a different number of times.

14. The method of claim 13, wherein a number of times that the antenna driver is driven is greater than a number of times that the touch driver is driven.

15. The method of claim 11, wherein during a time period between generating the signal to the sensing electrode to provide the haptic feedback and generating a subsequent signal to the sensing electrode to provide the haptic feedback, the haptic driver is driven only once and the touch driver and the antenna driver are alternatively driven a same number of times.

* * * * *